Patented Dec. 1, 1925.

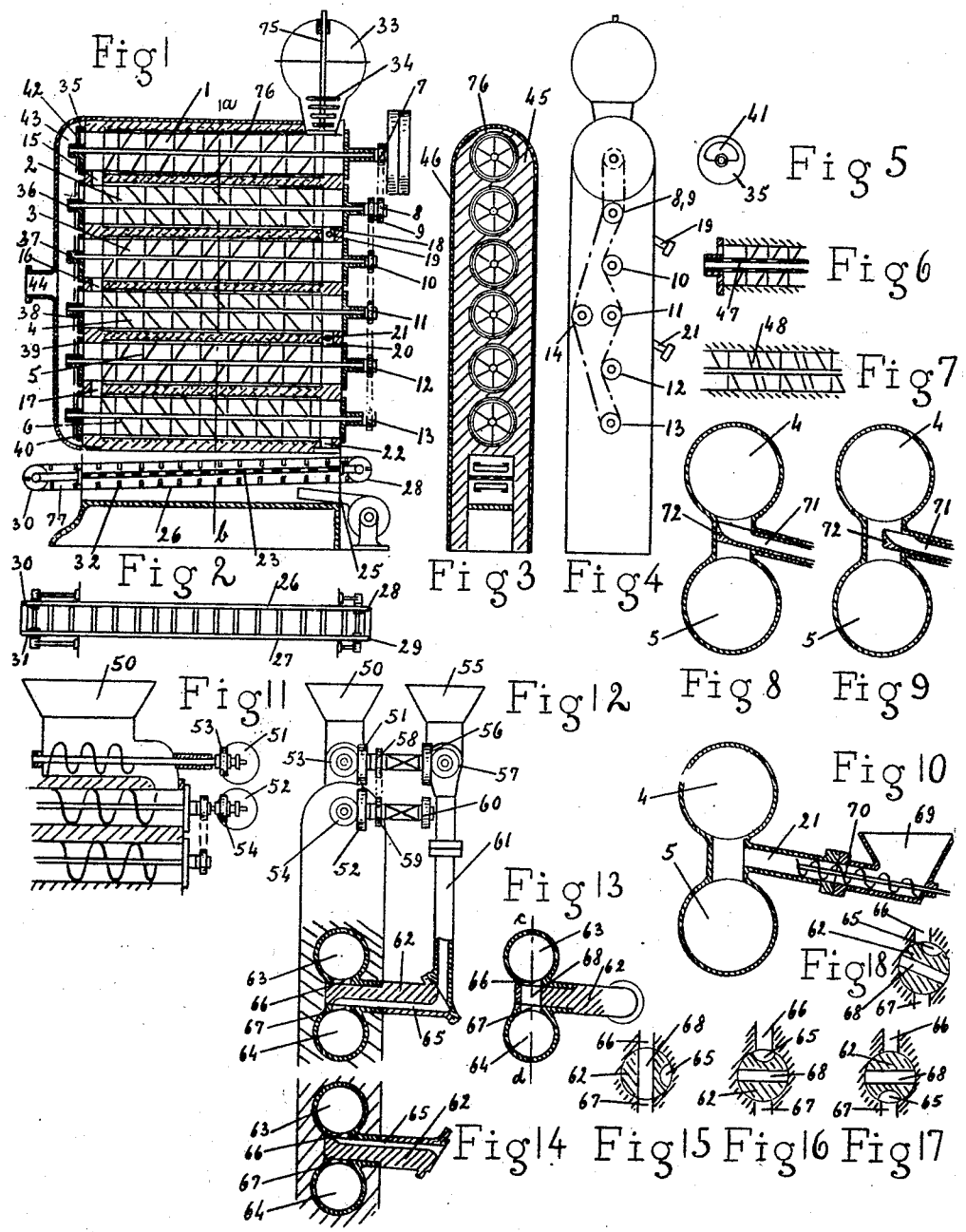

1,563,757

UNITED STATES PATENT OFFICE.

JAKOB LIEBERHERR, OF ISLIKON, SWITZERLAND.

ROASTING MACHINE.

Application filed January 9, 1923. Serial No. 611,636.

*To all whom it may concern:*

Be it known that I, JAKOB LIEBERHERR, a citizen of Switzerland, residing at Islikon, Kt. Thurgau, Switzerland, have invented certain new and useful Improvements in Roasting Machines, of which the following is a specification.

My invention relates to roasting machines and has for its object to put passages for special purposes between the roasting cylinders, in which helical conveyors propel the material to the opposite end of the cylinder. Slides or receivers, fitted with inlets and outlets for the material, are connected to the passages.

I will now proceed to more particularly describe my invention with the aid of the accompanying drawing, in which Fig. 1 is a sectional elevation of one form of the improved roasting machine, Fig. 2 is a bottom plan view of the drying device shown in Fig. 1, Fig. 3 is a tranverse section on the line *a—b* in Fig. 1, Fig. 4 is a side elevation of the said roasting machine, Fig. 5 is a view of the left-hand end-plate of one of the roasting cylinders, Fig. 6 is a longitudinal section through one end of one of the roasting cylinders showing the helical conveyors mounted on a hollow perforated shaft, Fig. 7 illustrates a modification according to which the shaft on which the helical conveyors are mounted is provided with stirring plates, Figs. 8 and 9 are respectively transverse sections through two of the roasting cylinders at the part entered by their connecting channel, showing a receiver with which they are provided in two positions, Fig. 10 is a similar section through two roasting cylinders showing a conical feeding vessel and means for introducing the material to be treated into the channel connecting the two cylinders, Fig. 11 is a partial sectional elevation of another form of the improved roasting machine provided with a friction gear for driving the helical conveyors at different speed, Fig. 12 is a part sectional side elevation of the upper part of another form of the improved roasting machine provided with two conical feed vessels, Figs. 13 and 14 are respectively sectional views through two roasting cylinders provided with an alternative form of receiver shown in different positions, and Figs. 15 to 18 are sectional views through the receiver and its housing on the line *c—d* in Fig. 13 showing the former in different positions.

According to the construction shown in Figs. 1 to 10 of the drawings the material to be treated, such as coffee, oats or the like is fed into the vessel 33 and the shaft 75 is moved into such a position that the discs 34 leave a sufficient space for the said material to fall into the cylinder 1. Helical conveyors propel the material to the opposite end of the said cylinder whereafter it falls through the channel 15 into the cylinder 2 whence the material is caused in like manner to pass through the other cylinders and channels 16, 17, 18 and 20 until it leaves the last cylinder 6 by way of the channel 22 that delivers it on to an inclined perforated plate 23 along which it is caused to travel by blades 32 carried by endless chains 26 and 27 mounted on chain wheels.

A ventilator 25 is provided to cool the goods by means of a current of air.

The roasting cylinders are heated by electrical coils 76 and any dust, moisture or chips in the cylinders is drawn out by the draft of an exhauster, connected to opening 44. For ascertaining how far the process of the roasting has proceeded, according to Fig. 9 the receiver 72 is shifted into the channel 18 or 20 of Fig. 1. A part of the goods will drop through the channel 71 to the outside, where the degree of the roasting can be tested. If the roasting is already finished in the cylinder 2 or 4, the whole material can be removed through the channel 71 shown in Fig. 8. In this case the cylinders 5, 6 could be used for roasting another part of the same material. For this purpose the arrangement shown in Fig. 10 is employed according to which the vessel 69 with the helical conveyor 70 is fixed to the channel 21 and the new material is forced into the cylinder 5. If the cylinders are filled up too high, a hollow shaft 47, shown in Fig, 6, is employed through which the moisture and dust can be removed by the draft of the exhauster. If the screw blades are not able to stir the material sufficiently, special stirring blades 48, shown in Fig. 7 are provided.

When the apparatus is intended to treat at the same time different materials that require different times for roasting, the arrangement shown in Figs. 11 to 18 may be employed.

According to this construction two separate vessels 50, 55 with helical conveyors are put on top of the roaster. The conveyors are driven by the friction discs 51, 53 and 56, 57. The vessel 50 delivers the material to the roasting cylinders at the top and the vessel 55 to the cylinders at the bottom. The channels between the roasting cylinders are arranged like the channels 18, 19, 20 and 21 in Fig. 1. The channel 20 is provided with a slide 62 that can be turned and has a slot 68 and a groove 65. The pipe 61 connects the slide 62 with the vessel 55.

The different positions of the slide are shown in the Figs. 12 to 18. The helical conveyors in the roasting cylinders are driven by friction discs 52, 54 with different speeds. The chain gearing 58, 59 is driven by a pulley 60, as is shown in Fig. 12. This pulley is driven by any electrical or mechanical source. By shifting the discs 53, 54 towards or away from the centre of the discs 51, 52 the speed of the corresponding conveyor will be changed. The chain drive of the different screws is just the same as in Fig. 1. The chainwheel 9ª in Fig. 11 corresponds with chainwheel 9 in Fig. 1 and chainwheel 10ª with 10 in Fig. 1. In Fig. 1 six cylinders are used and in the construction illustrated by Fig. 11 five of which only two cylinders are shown. In Fig. 12 only cylinders, 63, 64 are shown, while the others are omitted. The conveyors in the cylinders shown in Fig. 1 are composed of different plates but those shown in Fig. 11 are made from one piece.

The arrangement illustrated by Figs. 11 to 18 works in the following way.

Vessel 50 may be filled up with flour and the vessel 55 with oats. The flour falls into the upper roasting cylinders and the oats into the lower ones. The position of the slide 62 is shown in Figs. 12 and 17.

The flour is taken out after roasting through channels 18 and spout 19 (Fig. 1).

This slide 62 is shown in Fig. 12 in the channels 18, 19 but its position should be that shown in Figs. 14 and 16. The oats are delivered through the channel 22 on to the perforated plate 23.

When coffee is roasted all the cylinders must be used. In this case the position of the slide 62 is shown in Figs 13 and 15. When the degree of roasting is to be tested, the slide 62 is turned into the position shown in Figs. 14 and 18 for a moment so that a small quantity of the material may be taken out. Immediately afterwards the slide 62 is turned back to its old position and the coffee passes through the remaining cylinders and leaves the last through the channel 22.

Having now particularly described and ascertained the nature of my said invention and in what manner the same is to be performed, I declare that what I claim is:

1. In a roasting device the combination of several roasting cylinders, helical conveyers rotating in the cylinders, arrangement for changing the speed of the helical conveyers, passage between the roasting cylinders, means inserted in such passages and which may be used either as an inlet or an outlet for material.

2. In a roasting device the combination of several roasting cylinders, surrounded by electric heating coils, set in brick, helical conveyers rotating in the cylinders, arrangement for changing the speed of the helical conveyers, passages between the roasting cylinders connecting alternate ends of said cylinders, means inserted in such passages and which may be used either as an inlet or an outlet for material.

3. In a roasting device the combination of several roasting cylinders, surrounded by electric heating coils set in brick, helical conveyers rotating in the cylinders, arrangement for changing the speed of the helical conveyers, passages between the roasting cylinders connecting alternate ends of said cylinders, means inserted in such passages and which may be used either as an inlet or an outlet for material, an inclined perforated plate on to which the material treated is delivered and means for causing a current of air to pass through said perforations.

In testimony whereof I affix my signature.

JAKOB LIEBERHERR.